(12) United States Patent
Rall

(10) Patent No.: US 6,856,165 B2
(45) Date of Patent: Feb. 15, 2005

(54) CIRCUIT FOR ADAPTING CHARACTERISTIC WAVE IMPEDANCE

(75) Inventor: Bernhard Rall, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/631,005

(22) Filed: Jul. 31, 2003

(65) Prior Publication Data

US 2004/0135646 A1 Jul. 15, 2004

(30) Foreign Application Priority Data

Aug. 1, 2002 (DE) ......................................... 102 35 158

(51) Int. Cl.$^7$ ............................................. H03K 19/003
(52) U.S. Cl. ............................. 326/30; 326/21; 333/32
(58) Field of Search ............................. 326/30–31, 33, 326/21; 333/32

(56) References Cited

U.S. PATENT DOCUMENTS 5,467,455 A * 11/1995 Gay et al. ................... 710/100
5,835,535 A * 11/1998 Patel et al. .................. 375/257
6,690,191 B2 * 2/2004 Wu et al. ...................... 326/30

FOREIGN PATENT DOCUMENTS

DE        196 36 816 C2    11/1996

OTHER PUBLICATIONS

*Drosseln sichern EMV auf Kfz–Bussystemen*, Kurt Marth, Components 31 (1993) Heft 5, pp. 172–174.

* cited by examiner

Primary Examiner—James H. Cho
(74) Attorney, Agent, or Firm—Crowell & Moring LLP

(57) ABSTRACT

In a circuit arrangement for adapting the characteristic wave impedance at line ends of a vehicle data bus having at least two data bus lines and data terminals, each with a transceiver unit for differential-mode signal transmission on the data bus, the data bus is connected to the transceiver unit via a connection interface that includes a reactor for filtering interference on the data bus and an adaptation resistor network for adapting the characteristic wave impedance of a data bus line. The adaptation resistor network is arranged between the reactors and the respective line ends of the data bus lines, while the adaptation resistor network connects the line ends to ground via a capacitor.

16 Claims, 3 Drawing Sheets

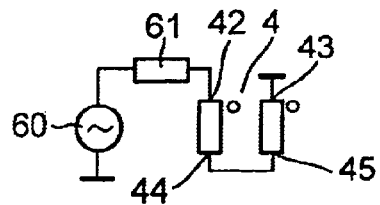
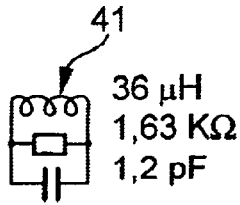
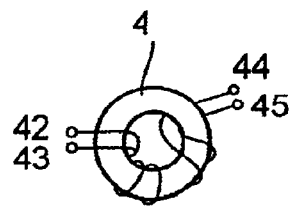
Fig. 5a      Fig. 5b      Fig. 5c
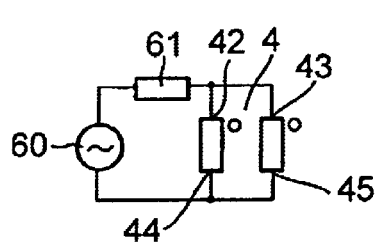
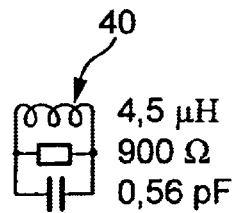
Fig. 6a      Fig. 6b
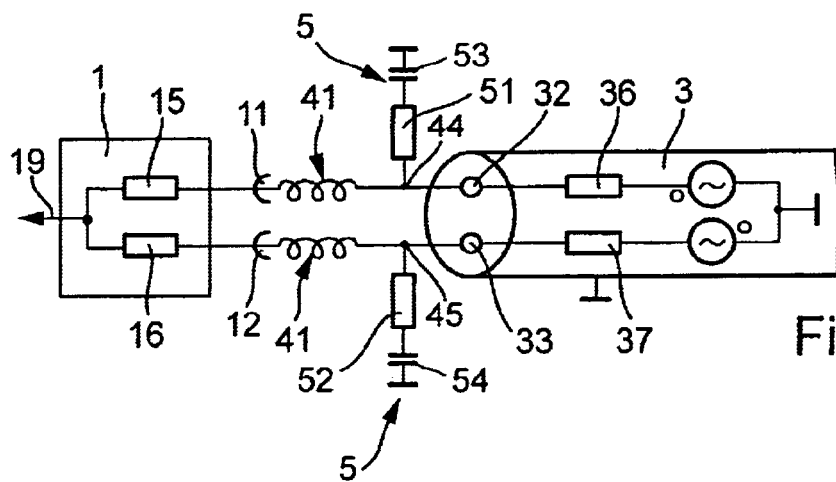
Fig. 7

CIRCUIT FOR ADAPTING CHARACTERISTIC WAVE IMPEDANCE

BACKGROUND AND SUMMARY OF THE INVENTION

This application claims the priority of German Patent Application DE 10235158.9, filed Aug. 1, 2002, the disclosure of which is expressly incorporated by reference herein.

The invention relates to a circuit arrangement for adapting the characteristic wave impedance at line ends of a data bus in a vehicle.

The current state of the art for interconnection of computers and computer systems includes high-speed data transmission systems that are connected to one another (normally in a star-shaped configuration, by means of switching systems or gateways) via screened lines that are balanced with respect to ground. Data rates of up to 100 Mbit/sec can be implemented by means of copper lines. Even higher data transmission rates are possible using cables made of glass fiber.

When these technologies are applied to data bus systems in vehicles, their electromagnetic compatibility (EMC) must be taken into account in order to fulfil the EMC regulations for motor vehicles (for example ISO 7637, DIN 40 839). To do this, the control units must be immune to external electromagnetic influences. In addition, the electromagnetic emissions from data bus systems must be minimized.

Data bus systems or cable networks in vehicles are composed of connecting lines that couple a multiplicity of different data terminals to one another. Such data terminals include, for example, the various electrical and electronic systems such as ignition system, electronic injection system, anti-lock brake system, airbag, car radio, car telephone, sensors, actuators, etc., which are installed in the vehicle and interconnected via a data bus system. The data terminals have a transceiver unit for connecting to the data bus system. Depending on the type of connection, the connecting lines to the data terminals fulfill different functions, including in particular the supply of direct current, control and exchange of data.

However, in addition to the direct supply currents and useful signals which are used for this purpose, radio-frequency interference signals, which are either generated in the vehicle or radiated in from the exterior, also occur in such cable networks. In the frequency range of such radio-frequency interference signals, the cable networks exhibit a multiplicity of resonant frequencies. Given such resonant frequencies, the interference signals can reach high voltage and current values, which can lead to considerable interference or damage in sensitive and high-impedance electronic components, for example those using CMOS technology. Resonant frequencies also promote the radiation of interference signal harmonics which are generated in the vehicle.

In addition, the data terminals are generally not adapted to the common-mode properties of the vehicle network so that in all their branches there are resonances for interference signals that are generated externally. Moreover, the suppression of these interference signals is thus also made difficult.

Basically, a number of factors are responsible for propagation of electromagnetic interference in cable networks. In particular the line properties such as characteristic wave impedance of the connecting lines and the properties of the line terminations as well as of the data line reactor as a component play an important role here.

German Patent Document DE 196 36 816 C2 discloses an arrangement for reducing radio-frequency interference in cable networks for supplying current and control signals in vehicles, in which ferrite reactors are installed in individual connecting lines and provide a radio-frequency impedance that is high in comparison with the characteristic wave impedance of the lines. This measure gives rise to a passive characteristic wave impedance termination, and the load is decoupled from the line network.

High-speed data transmission systems for data transmission rates of at least 10 Mbit/sec are new. They also generate common-mode spectra whose maximum frequencies may rise up to 1 GHz, making it more difficult to combat them than in the past. The reactors which have been used hitherto are sector-wound, with a scatter of 1–2 $\mu$H. The useful signal is distorted by the abovementioned leakage inductance to such an extent that it can no longer be used for the transmission of data.

The article "Drosseln sichern EMV auf Kfz-Bussystemen [Reactors ensure EMC on motor vehicle bus systems]" (K. Marth, Siemens Components 5/93, pages 172–174) discloses various data line reactors for CAN bus systems which ensure fault-free functioning of the CAN bus system and increase the insertion loss in the common mode by 10 dB in comparison with a standard reactor.

One object of the invention is to provide a circuit arrangement that optimizes the adaptation of characteristic wave impedance at the cable ends in order to suppress externally generated in common-mode interference voltages.

This and other objects and advantages are achieved by the circuit arrangement according to the invention, in which an adaptation resistor network is arranged between the reactors and the respective line ends of the data bus lines. The adaptation resistor network connects the line ends of the data bus lines to ground, via a capacitor.

Transceiver units of data terminals are data transmission drivers. These units form the electrical connection between the data terminal and the cable, reactors being connected between the transmitter component and receiver component of the transceiver unit to filter interference.

In particular, this arrangement can be used to suppress common-mode interference signals. In this respect, it is significant that the adaptation resistor network is placed directly between the reactors and the data bus line (that is, at the line end).

The circuit arrangement according to the invention also ensures that the characteristic wave impedance of the cable is adapted to the given impedance of the transceiver unit.

Terminating the data bus lines by means of the adaptation resistor network prevents the open data bus line from being made to resonate to a high degree, which also reduces the reflection.

The circuit arrangement according to the invention also has the advantage that the voltage at the line end is damped by the reactors upstream of the transceiver unit.

In the adaptation resistor network, the stabilizing resistors are preferably connected to ground via a common base capacitor, making it possible to dispense with a second capacitor (that is, a further component).

The values of the stabilizing resistors of the adaptation resistor network are ideally determined for adapting the source resistance of the transceiver unit to the characteristic wave impedance of the data bus lines in differential-mode voltage. As a result, common-mode interference signals and differential-mode interference signals are simultaneously suppressed to an optimum degree.

Other objects, advantages and novel features of the present invention will become apparent from the following detailed description of the invention when considered in conjunction with the accompanying drawings.

BRIEF DESCRIPTION OF THE DRAWINGS

FIG. 1.*b* shows an equivalent circuit 2 for the measuring circuit of FIG. 1.*a*;

FIG. 5.*a* shows a measuring circuit for determining the impedance components of the reactor 4 in the case of differential-mode voltages;

FIG. 5.*b* shows an equivalent circuit 41 for the measuring circuit of FIG. 5.*a*;

FIG. 5.*c* shows the physical configuration of the reactor 4;

FIG. 6.*a* shows a measuring circuit for determining the impedance components of the reactor 4 in the case of common-mode voltages;

FIG. 6.*b* shows an equivalent circuit 40 for the measuring circuit of FIG. 6.*a*;

FIG. 7 shows an equivalent circuit according to the invention with symmetrical wave transmission;

DETAILED DESCRIPTION OF THE DRAWINGS

Figure 9:
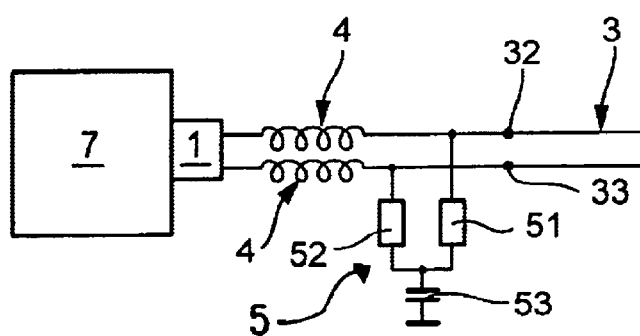
FIG. 9 shows a circuit arrangement according to the invention.

The circuit arrangement according to the invention for adapting the characteristic wave impedance at line ends of a data bus in a vehicle is illustrated in FIG. 9. The circuit arrangement has a data bus with at least two data bus lines 3 and data terminals 7, each with a transceiver unit 1 for differential-mode signal transmission on the data bus. The data bus is connected to the transceiver unit 1 at a connection interface, a respective reactor 4, 40, 41 for filtering interference on the data bus being connected between the data bus line 3 and the associated transceiver unit 1, and an adaptation resistor network 5 being provided for adapting the characteristic wave impedance of a data bus line. The adaptation resistor network 5 is arranged between the reactors 4, 40, 41 and the respective line ends 32, 33 of the data bus lines 3. In addition, the adaptation resistor network 5 connects the line end 32, 33 of the data bus lines 3 to ground via capacitors 53, 54.

In the exemplary embodiment, the data bus lines 3 are guided in a cable or connecting line 3. The connecting line 3 is part of a FlexRay™ data bus within a vehicle, in which data transmission rates of over 10 Mbit/sec are possible. The circuit arrangement can however also be used in data bus systems such as TTP/C or CAN, for example.

As noted previously, data terminals 7 are, for example, the various electrical and electronic systems such as ignition system, electronic injection system, anti-lock brake system, airbag, car radio, car telephone, sensors, actuators, etc. that are installed in a vehicle and interconnected via a data bus system.

The transceiver units 1 of data terminals 7 form the electrical connection between the data terminal 7 and data bus lines or connecting line 3. This electrical connection is made generally using plug-in contacts.

The transceiver units 7 transmit data between the data terminals 7 via the connecting line 3, which is embodied as a two-wire line, in the differential-mode signal. The useful signal in this mode is determined from the voltage level difference on the data bus lines 3. For this purpose, the voltage levels of the signal may be conducted symmetrically or asymmetrically by a specific voltage value.

The connecting lines 3 of the FlexRaY™ data bus are embodied as two-conductor copper line networks which are electrically balanced with respect to ground (that is, electrically screened). In order to carry out differential two-wire transmission on these connecting lines, the signal is conducted in mirror-inverted form, in electrical terms, on the opposite line.

The data bus lines of the connecting line 3 could also be embodied differently, for example as a twisted two-wire line, referred to as a "twisted pair."

The connection interface in FIG. 9 is the region between line ends 32, 33 and the transceiver unit 1. As a result, the connection interface determines the region which holds elements for adapting the characteristic wave impedance for filtering interference. The connection interface may be embodied as a separate component or it can be integrated into the transceiver unit 1. The latter alternative has the advantage that only one plug-in connection between line ends 32, 33 and transceiver unit 1 is necessary.

In the connection interface, common-mode reactors 4 are connected between the line ends 32, 33 of the connecting line 3 and the transceiver unit 1. The reactors 4 are wound with two wires and have a 30 to 60 times smaller leakage inductance in the case of differential-mode interference pulses than the previously used sector-wound reactors. The reactors which are used do not distort even a 10 Mbit/sec data signal; they can be obtained under the designation C113N from EPCOS http://www.epcos.de. The reactor 4 has two connection points 42 to 45 in each case, that is to say two points per wire.

The adaptation resistor network 5 in FIG. 9 is arranged between the line ends 32, 33 of the connecting line 3 and the reactors 4, 40, 41 (FIGS. 5.*b*, 6.*b* and 7–9). The data bus lines 3 are each connected to ground via electrical resistors 51, 52 by means of a common base capacitor 53. The value of the resistors 51, 52 and of the capacitor is determined by customary measuring methods, as explained below. For suppression of common-mode interference signals it is important for the adaptation resistor network 5 to be placed directly between reactors 4, 40, 41 and data bus line 3 (that is, at the cable end 32, 33).

The value of the resistors 51, 52 is defined by the differential-mode circuit arrangement in FIG. 7. In a representative embodiment, instead of being under no load, with the high reactor impedance of a maximum 900 Ω in the case of common-mode interference pulses, the connecting line 3 has a common-mode impedance of approximately 25 Ω, and is sufficiently terminated with the parallel resistors 51, 52, each having a resistance of 110 Ω, resulting in a combined resistance of 55 Ω. By terminating the connecting line 3 with the resistance component, the open line 3 is prevented from experiencing large resonances, so that the reflection is also lower.

Figure 8:
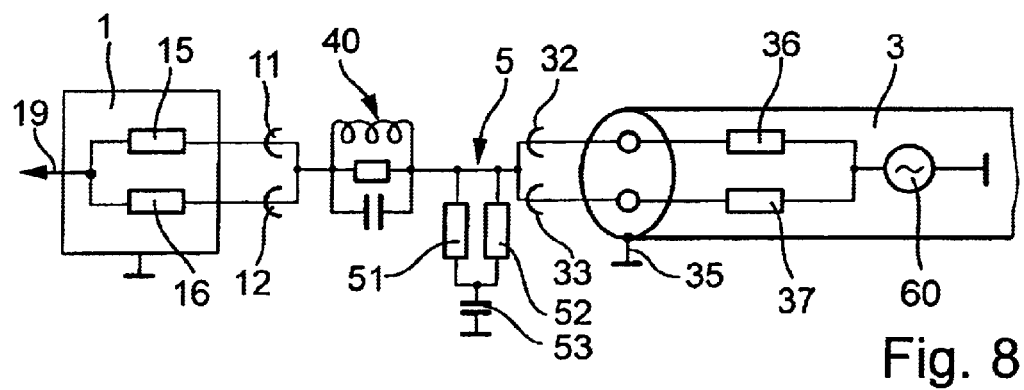
FIG. 8 shows an equivalent circuit according to the invention with asymmetrical wave transmission.

In addition to the smaller probability of excess resonances on the line 3, the voltage at the cable end 32, 33 is also damped by the reactor 40 upstream of the transceiver 1 by means of the equivalent-diagram circuit arrangement in FIG. 8. This is a useful property in particular when there are high radiated-in common-mode voltages.

The circuit arrangement according to the invention from FIG. 9 is ideally suitable in data bus systems with high data transmission rates and high-speed transceivers, as high common-mode interference voltages occur in these very systems.

In order to determine the values for the adaptation resistor network 5, the impedance of the transceiver unit 1, the characteristic wave impedances 36, 37, 39 of the connecting line 3 and the inductance or impedance of the reactor 40 or 41 must be determined empirically for the given terminal arrangement by means of measuring circuits.

Figures 1A, 1B:
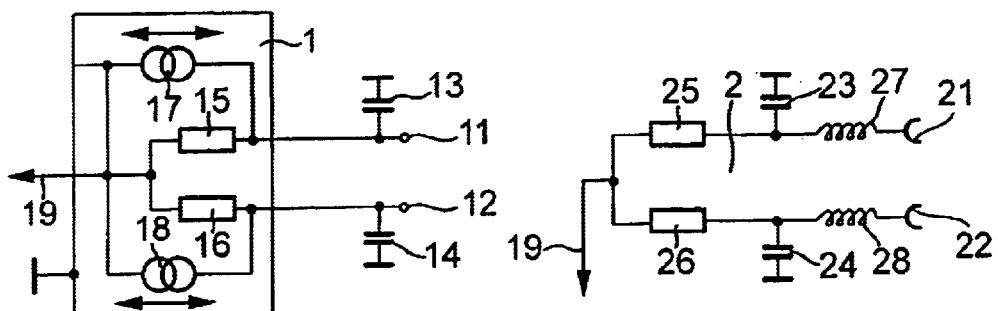
FIG. 1.*a* shows a measuring circuit for determining the impedance of the transceiver 1.

Determining the impedance of the transceiver 1:

FIG. 1.a illustrates a transceiver 1—reduced to the essential elements for determining adaptation—of a data terminal for simulation of the properties thereof in response to the common-mode voltages which constitute the interference. The transceiver 1 thus corresponds to the transceiver unit 1 for communicating with the data terminal 7, for example a sensor, via the FlexRay™ data bus.

The transceiver 1 has the two source resistors 15, 16 with, for example, 70 Ω, and the bidirectional current sources 17, 18 with, for example, ±10 mA. In addition, the simplified circuit arrangement of the transceiver 1 has a low-impedance voltage source 19 with a reference voltage of half the operating voltage of, for example, 2.5 V. The connections 11, 12 constitute the connections to the data bus. In the FlexRay™ data bus system these connections are designated by BP (Bus Signal Positive) and BN (Bus Signal Negative). The capacitors 13 and 14 are to be considered only for technical measuring reasons.

The equivalent circuit diagram 2 (FIG. 1.b, equivalent to the circuit arrangement 1, in FIG. 1.a) contains the resistors 25, 26 (which, with 70 Ω each, correspond to the resistors 15, 16), the switching capacitances 23, 24, with 6 pF each, and the leakage inductances 27, 28 of 16.3 nH each of which corresponds to parasitic inductances of lines on the printed circuit board.

Figure 2:
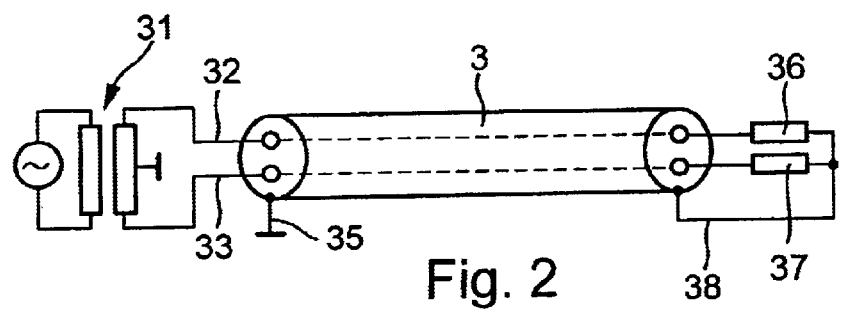
FIG. 2 shows a measuring circuit for determining the symmetrical characteristic wave impedances 36, 37 of line 3.

Determining the characteristic wave impedances 36, 37, 39 of line 3:

FIG. 2 shows the measuring circuit for determining the differential-mode characteristic wave impedance. The measuring arrangement in FIG. 2 has an alternating voltage unit with a balanced transformer 31, which unit permits a sufficiently large frequency spectrum (100 kHz to 100 MHz) to be passed through. The reflection factor S11 is defined by $$S11=(Z-50\ \Omega)/(Z+50\ \Omega),$$

Z being the complex input impedance of the cable 3 at the points 32 and 33. The value of S11 is kept constant by adjusting the resistors 36, 37. Reference numerals 35 and 38 designate the screen ends which are used on a standard basis. The measuring arrangement in FIG. 2 (that is, measuring symmetrical characteristic wave impedance over the differential-mode voltage distribution at the points 32 and 33) yields a value of 2×43 Ω=86 Ω for the symmetrical characteristic wave impedance 36+37 of the two-conductor cable 3.

Figure 3:
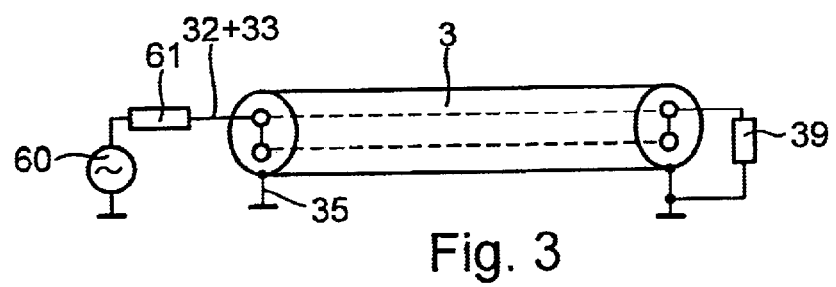
FIG. 3 shows a measuring circuit for determining the asymmetrical characteristic wave impedance 39 of line 3.

FIG. 3 shows an impedance measuring circuit for common-mode determination 39 of the characteristic wave impedance of a two-conductor, screened connecting line 3. Here, when there is a common-mode voltage, the reflection factor S11 (defined above) is measured, the two-conductors of line 3 being connected in parallel. The arrangement in FIG. 3 has, for this purpose, a frequency-tuneable voltage source 60 and source resistor 61 of 50 Ω. 35 and 38 are the screen ends which are used on a standard basis. A common-mode characteristic wave impedance for the line 3 of 25.8 Ω was determined.

Figure 4:
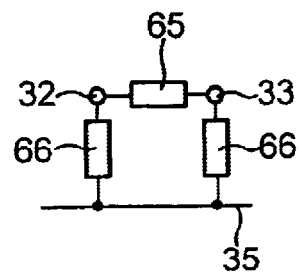
FIG. 4 shows an equivalent circuit diagram with component characteristic wave impedances 65, 66 for the circuit arrangement from FIGS. 2 and 3.

The triangular equivalent circuit diagram from FIG. 4, which completely describes the characteristic wave impedance behavior of the cable 3 at the cable ends 32 and 33, is provided in order to summarize the circuits from FIGS. 2 and 3. The component characteristic wave impedance values determined are 51.6 Ω for the resistors 66, and 516 Ω for the resistor 65. The further cable properties such as inductance coating and capacitance coating can be determined using the equivalent circuit diagram from FIG. 4 and the corresponding empirically determined resistance values 65, 66.

Determining the impedance components of the reactor 4:

FIG. 5.a illustrates a measuring circuit for determining the leakage inductance of the reactor 4 in the case of differential-mode voltages, the reactor being connected in such a way that 42 represents the input point and 43 the output point. A value of 36 nH is obtained as the leakage inductance of the reactor 4 in the equivalent circuit diagram 41 (FIG. 5.b).

FIG. 6.a illustrates a measuring circuit for determining the common-mode impedance of the reactor 4. The latter is connected in a current-compensated fashion, and the two-conductor line is connected magnetically in the opposite direction. As a result, the points 42, 43 form the input of the reactor 4, and the points 44, 45 form the output of the reactor 4. In the current circuit diagram 40 of the reactor 4 (FIG. 6.b), a resistance of 900 Ω, an inductance of 4.5 μH and a capacitance of 0.56 pF result.

The equivalent circuit according to the invention is illustrated in FIGS. 7 and 8, FIG. 7 illustrating the arrangement for symmetrical signal transmission, and FIG. 8 the arrangement for asymmetrical signal transmission. The equivalent circuit according to the invention has a transceiver 1 which is connected to the line 3 via the reactor 40 or 41 which is arranged between the cable conductor connections 11 and 32, or 12 and 33, respectively.

The adaptation resistor network 5 in the equivalent circuits in FIGS. 7 and 8 is connected between reactor 40 or 41 and line 3. The adaptation resistor network 5 adapts the characteristic wave impedance of the line 3 to the impedance of the transceiver 1, the values which are determined above empirically applying to the resistors 15, 16, 36, 37, 39.

Two alternative voltage sources 60 which operate in the differential mode were used as model pulse sources for signal interference in FIG. 7. For the differential-mode pulse signal, only the empirically determined small leakage inductance of 36 nH is significant for the reactor 4. As a result, the equivalent circuit diagram 41 of the reactor 4 in the circuit arrangement in FIG. 7 is divided between two inductances of 18 nH each.

The resistances 51, 52 in the adaptation resistor network 5 of FIG. 7 are each found to be 110 Ω, in order to stabilize, in the transceiver 1, the 2×70 Ω in the resistors 15, 16 of the respective characteristic wave impedance—determined above—of the line 3 of 86 Ω. The capacitors 53 and 54 are not absolutely essential but are provided, as the lines are on average at 2.5 V. As is shown in FIGS. 8 and 9, it is simpler and saves costs to use only one capacitor 53.

The impedance of the transceiver 1 at 70 Ω at each of the resistors 15, 16 and 25, 26 is too high to compensate the characteristic wave impedance of the line 3. Since the impedance of the transceiver 1 or of the data terminal 7 on the connecting line 3 is predefined, as is the cable resistance of the connecting line 3, different impedance values of the line 3 and of the transceiver 1 can be adapted only using the adaptation resistor network 5.

In the case of differential-mode interference signals or symmetrical data transmission, as in the equivalent-diagram circuit arrangement in FIG. 7, the adaptation resistor network 5 could also be arranged between the transceiver 1 and reactor 41.

FIG. 8 illustrates the equivalent circuit diagram for the common-mode interference pulse model signal. The voltage source 60 supplies the common-mode interference pulse. The two resistors 36 and 37 in the line 3, which are connected in parallel, correspond approximately to the value of the characteristic wave impedance 39—determined by means of the arrangement in FIG. 3—of the line 3 of 25 Ω.

When the impedance of the transceiver 1 is adapted to the characteristic wave impedance—determined above—of the line 3 it is necessary to take into account the fact that the impedance of the transceiver 1 at 2×70 Ω is too large for the impedance of the line 3 of 25.8 Ω, determined by measuring the common-mode characteristic wave impedance.

A simple analysis will now underline the advantage of the circuit arrangement according to the invention with the model values:

Signal changes in the equivalent-diagram circuit arrangement according to FIG. 7 induced by the leakage inductance of 36 nH of the reactor 41 in a circuit with impedances of 2×86 Ω=172 Ω yields a limiting frequency f of 716 MHz where $\tau=L/R$ and $f=1/2\pi\tau$. Given data transmission rates in the region of 10 Mbit/sec, corresponding to a data pulse period of 100 ns, this interference is insignificant.

A signal change due to common-mode interference pulses in the equivalent-diagram circuit arrangement according to FIG. 8 experiences damping of (55/25.8+55)=−3.34 dB at the termination of the line 3 with adaptation resistor network 5. In addition, the common-mode interference signal experiences damping of (35/900+35)=−28.5 dB due to the reactor 40 at the transceiver 1, the parallel connection of the resistors 15, 16 with 70 Ω each to form 35 Ω and the reactor impedance of 900 Ω being included. There is thus overall damping of −31.84 dB.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A circuit arrangement for adapting characteristic wave impedance at line ends of a vehicle data bus, comprising:
    a data bus with at least two data bus lines; and
    a plurality of data terminals, each having a transceiver unit that is coupled to the data bus via a connection interface, for differential-mode signal transmission on the data bus; wherein
    each connection interface comprises a reactor that filters interferences on the data bus, said reactor being connected between the data bus lines and an associated transceiver unit, and an adaptation resistor network that adapts characteristic wave impedance of the data bus lines;
    the adaptation resistor network is arranged between the reactor and line ends of the data bus lines;
    the adaptation resistor network connects the line ends of the data bus lines to ground; and
    the adaptation resistor network is connected to ground via a capacitor.

2. The circuit arrangement according to claim 1 wherein:
    the adaptation resistor network comprises stabilizing resistors at respective line ends; and
    the stabilizing resistors are connected to ground via a common base capacitor.

3. The circuit arrangement according to claim 1, wherein the stabilizing resistors have a resistance value that compensates for incorrect adaptation of the source resistance of the transceiver unit to the characteristic wave impedance of the data bus lines in differential-mode voltage.

4. The circuit arrangement according to claim 1, wherein the voltages on the data bus lines are balanced relative to each other with respect to ground.

5. A method for adapting characteristic wave impedance at line ends of a vehicle data bus having at least two data bus lines that are connected with respective transceiver units of a plurality of data terminals associated with said data bus, said method comprising:
    providing a connection interface that couples each of said transceiver units with said line ends, said connection interface comprising a reactor connected between the data bus lines and an associated transceiver unit for filtering interferences on the data bus, and an adaptation resistor network for adapting the characteristic wave impedance of the data bus lines;
    wherein said steps of providing a connection interface includes
    arranging the adaptation resistor network between the reactor and the respective line ends of the data bus line; and
    connecting the line ends of the data bus line to ground via a capacitor which is part of the adaptation resistor network.

6. The method according to claim 5, wherein:
    the adaptation resistor network includes stabilizing resistors connected with respective line ends; and
    the stabilizing resistors are connected to ground via a common capacitor.

7. The method according to claim 5, further comprising choosing a resistance value for the stabilizing resistors that compensates for incorrect adaptation of the source resistance of the transceiver unit to the characteristic wave impedance of the data bus lines in differential-mode voltage.

8. The method according to claim 5, further comprising balancing the voltages on the data bus lines relative to each other, with respect to ground.

9. A circuit arrangement for vehicles comprising:
    a data bus with at least two data bus lines;
    data terminals, each having a transceiver unit; and
    a connecting interface coupling the data bus with the transceiver unit, said connecting interface including,
    a reactor connected between the data bus line and the associated transceiver unit; and
    an adaptation resistor network, arranged between the reactors and line ends of the data bus lines, said adaptation resistor network including a capacitor that connects line ends of the data bus lines to ground.

10. The circuit arrangement according to claim 9, wherein the adaptation resistor network comprises resistors connected between the respective line ends and ground in series with said capacitor.

11. The circuit arrangement according to claim 9, wherein said resistors have a resistance value that compensates an incorrect adaptation of a source resistance of the transceiver unit to a characteristic wave impedance of the data bus lines, in differential-mode voltage.

12. The circuit arrangement according to claim 9, wherein the data bus lines comprise connecting lines which are balanced with respect to ground.

13. A connection interface for coupling line ends of a vehicle data bus to a differential mode signal transceiver unit of a data terminal subscriber of said data bus, said connection interface comprising:

a reactor that filters interferences on the data bus, said reactor being connected between the data bus lines and an associated transceiver unit; and an adaptation resistor network that adapts characteristic wave impedance of the data bus lines; wherein, the adaptation resistor network is arranged between the reactor and the line ends of the data bus lines;

the adaptation resistor network connects the line ends of the data bus lines to ground via a capacitor.

14. The connection interface according to claim 13:

the adaptation resistor network comprises stabilizing resistors at respective line ends; and the stabilizing resistors are connected to ground via said capacitor.

15. The circuit arrangement according to claim 14, wherein the stabilizing resistors have a resistance value that compensates for incorrect adaptation of the source resistance of the transceiver unit to the characteristic wave impedance of the data bus lines in differential-mode voltage.

16. The circuit arrangement according to claim 15, wherein the voltages on the data bus lines are balanced relative to each other with respect to ground.

* * * * *